W. A. &. W. F. JOHNSTON.
Valves or Cocks.
No. 213,575.  Patented Mar. 25, 1879.
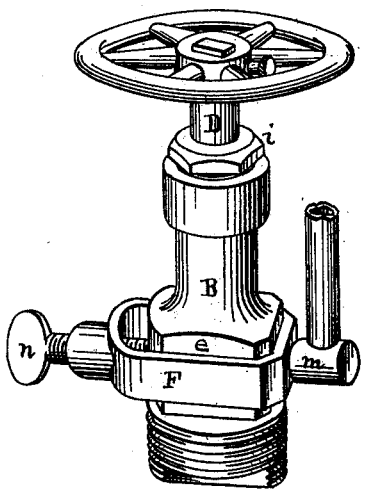
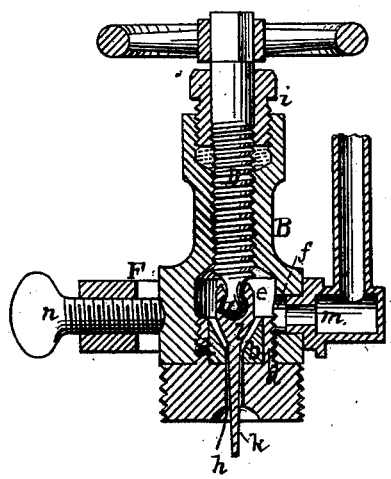
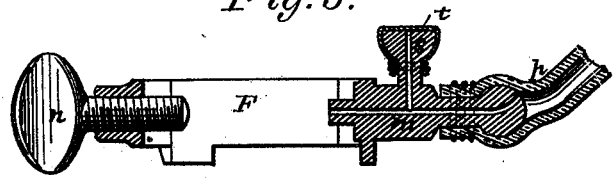

UNITED STATES PATENT OFFICE.

WILLIAM A. JOHNSTON AND WILLBUR F. JOHNSTON, OF EDGEWATER, N. Y.

IMPROVEMENT IN VALVES OR COCKS.

Specification forming part of Letters Patent No. 213,575, dated March 25, 1879; application filed February 27, 1879.

*To all whom it may concern:*

Be it known that we, WILLIAM A. JOHNSTON and WILLBUR F. JOHNSTON, of Edgewater, in the county of Richmond and State of New York, have invented certain new and useful Improvements in Valves or Cocks, of which the following is a specification:

Our invention, which may, in some respects, be considered an improvement on that described in W. A. Johnston's Patent No. 152,848, dated July 7, 1874, has relation to valves or cocks which, while they may be used for other purposes, are particularly designed to retain securely and to control the discharge or escape of highly-compressed gases, such as nitrous oxide and the like.

The preferred form of valves in which our invention is embodied has a jointed stem or plug, the upper end of which is made of steel or iron, and threaded and squared to receive an operating wrench or handle, while the lower end is made of brass or other metal not readily oxidized, and is given two distinct and different tapers. The lower portion consists of a long, slender, slightly-tapered stem, which enters the valve throat or opening to regulate the flow or escape of gas, while the upper portion, having an increased taper, or a shape approximating that of an ordinary conical valve, serves to open and close the escape-opening. When the stem or plug is screwed down to close the said opening, the joint of the stem permits the lower end or valve proper to seat itself accurately, closely, and firmly, although the upper portion, as sometimes happens, may be slightly out of line with the axis of the valve throat or seat.

The nature of our improvements, and the manner in which the same are or may be carried into effect, can best be explained and understood by reference to the accompanying drawings, in which—

Figure 1 is a perspective view, and Fig. 2 is a vertical central section, of a valve embodying said improvements.

The valve consists of a body, B, having its lower end bored out and internally screw-threaded, to fit upon the externally screw-threaded neck, $d$, which contains a soft-metal valve-seat, $b$, and is formed upon the bottle or vessel containing the compressed fluid or gas, or upon a plug adapted to be screwed into the head of such a vessel, the latter construction being shown in the drawings.

In the valve-body, above the point where the neck $d$ comes, is an enlarged chamber, $e$. From chamber $e$ an opening, $f$, extends through the side of the body, as an outlet-opening for the gas from the valve.

The upper end of the body is provided with a screw-threaded hole to receive the valve stem or plug D, the axis of which should coincide with that of the throat or opening $h$ in the valve-seat, as shown in Fig. 2. The thread of the valve-stem extends but a short distance above the chamber $e$, the upper end of the stem being cylindrical and smooth, and surrounded by a packing-gland, $i$, which insures a tight joint. Below the screw-thread the valve-stem is divided transversely, and the two portions are connected by a universal joint, $a$, which admits of lateral movement of the lower part independently of the upper, for the purposes hereinbefore mentioned.

The upper portion of the stem is made of iron or steel, and the lower section or portion is made of brass, or other durable metal or alloy which will not readily oxidize, this part being made of a material harder than that which forms the valve-seat. The said lower end of the valve-stem has a long, slender, gradually-tapering spindle, $k$, which extends down through the valve seat or throat, and also has above said graduating-spindle $k$ another tapered portion, $l$, of larger diameter and more abrupt taper, intended to work against the valve-seat.

The slender tapered extremity $k$, as it is moved up and down in the throat $h$, serves to regulate with great nicety the escape of gas, while the portion $l$ serves, when screwed down, to close the throat or opening, and so entirely arrest the escape of gas. The part $k$ also acts to keep the throat clear, and prevents the lodgment therein of foreign substances, thus assuring the proper action of the valve at all times.

By jointing the two portions of the valve-stem together, the valve on the lower portion is permitted to seat itself freely and accurately, although the upper portion may be out of line with the seat or throat.

The form of joint and the construction of the stem may be modified. We prefer, however, the joint shown, which consists of a ball on the upper portion of the stem, over and around which the upper end of the lower portion is spun, as shown, thus forming a perfect socket with little expense, and without multiplication of parts. The nature of the metal of which the lower portion is made permits the spinning to be done with facility.

For the purpose of conducting the gas from the valve or cock we employ a yoke, F, adapted to surround the body of the valve, and provided on one of its sides with a pipe, $m$, to enter or meet the outlet $f$, and with a thumb-screw, $n$, on the opposite side, by means of which the yoke may be caused to draw the pipe or nozzle $m$ tightly into or against the outlet-opening $f$. A packing-ring can be placed around the nozzle to make a tight joint when the yoke is in use.

In the use of highly-compressed gases great care is required to be exercised in closing the cock after using the apparatus. The valve may seem to be closed tight, while in reality there is a slight leak, which, during the days, or even weeks, that may intervene before the apparatus is again used, will perhaps empty the gas-holder. It is of importance, therefore, to provide some ready means of detecting slight leaks, especially in the case of nitrous oxide, which is entirely invisible, and almost without taste or smell. For this purpose we provide the yoke or discharge connection with a device which will readily make manifest a leak however slight.

This arrangement is shown in Fig. 3, which is a transverse vertical section of the yoke and its appurtenances. In this figure the yoke F, with its nozzle $m$ and thumb-screw $n$, does not materially differ from the like lettered parts in Figs. 1 and 2, save that the outer end of the nozzle is of bulb form, the mouth of the discharge-outlet being located to one side of the longitudinal axis of the bulb. The rubber pipe $h$, that conveys the gas to the point where it is to be used, is drawn over the bulb, and fastened tightly to the nozzle or stem $m$. Between the bulb and the yoke on the nozzle $m$ is the detecting-tube $s$, opening into the discharge-outlet, and having its upper end covered by a tight rubber or other elastic or extensible diaphragm, $t$.

To ascertain whether there be any leakage after the valve is closed, bend the rubber pipe $p$ so that it will close the discharge-orifice in the bulb. If there be any leakage, the gas, its escape through the pipe $p$ being cut off, will pass up through the test or detecting tube $s$, and by expanding or swelling the diaphragm $t$ will disclose its presence. In this way very minute leakage can readily be detected.

Having described our invention, what we claim, and desire to secure by Letters Patent, is—

1. In apparatus capable of retaining fluids under great pressure, a valve-seat of lead, tin, or alloy of similar soft and non-oxidizable character, in combination with a valve plug or stem the valve end of which is of harder, but also non-oxidizable, metal, substantially as set forth.

2. The jointed valve-stem consisting of an upper portion, terminating at its lower end in a ball, and a lower portion, whose upper end is spun around the said ball in the form of a socket, as and for the purposes set forth.

3. A valve stem or plug and a non-oxidizable metallic valve proper, connected therewith by a universal joint, in combination with a valve-seat composed of a softer non-oxidizable metal, substantially as set forth.

4. In a cock or valve for retaining fluids under great pressure, a stem or plug having its outer end of steel or iron, and its inner end of a non-oxidizable metal, substantially as set forth.

5. The combination of a screw-threaded iron or steel valve stem or plug and a valve proper, of non-oxidizable metal, connected with said plug by a universal joint, substantially as set forth.

6. In a cock or valve capable of retaining fluids under heavy pressure, a stem or plug having its valve end or point formed in two sections of different taper, when arranged to operate substantially as described.

7. In combination with a valve-seat, the stem or plug $d$, having the long, slender, and tapering spindle $k$, and the large portion $l$, substantially as and for the purposes set forth.

8. In combination with the yoke or discharge connection and the discharge nozzle or pipe, the detecting-tube and elastic or extensible diaphragm covering the exposed end of said tube, substantially as and for the purposes set forth.

In testimony whereof we have hereunto set our hands this 25th day of February, 1879.

WILLIAM A. JOHNSTON.
WILLBUR F. JOHNSTON.

In presence of—
ELIAS M. WHITE,
IRVING E. BOND.